US011772307B2

(12) United States Patent
Jang et al.

(10) Patent No.: US 11,772,307 B2
(45) Date of Patent: Oct. 3, 2023

(54) ISOSTATIC PRESS APPARATUS ENABLING RAPID HEATING AND COOLING USING PRESSURIZED LIQUID CIRCULATION FAN

(71) Applicant: ENERGYN INC., Hwaseong-si (KR)

(72) Inventors: Jin Suk Jang, Incheon (KR); Ihn Kee Hwang, Incheon (KR)

(73) Assignee: ENERGYN INC., Hwaseong-si (KR)

( * ) Notice: Subject to any disclaimer, the term of this patent is extended or adjusted under 35 U.S.C. 154(b) by 287 days.

(21) Appl. No.: 17/197,028

(22) Filed: Mar. 10, 2021

(65) Prior Publication Data
US 2022/0234260 A1 Jul. 28, 2022

(30) Foreign Application Priority Data
Jan. 26, 2021 (KR) .................. 10-2021-0010967

(51) Int. Cl.
 B29C 43/52 (2006.01)
 B29C 43/10 (2006.01)
 B29C 43/36 (2006.01)
 B29C 43/56 (2006.01)
(52) U.S. Cl.
 CPC ............. B29C 43/52 (2013.01); B29C 43/10 (2013.01); B29C 43/36 (2013.01); B29C 43/56 (2013.01); B29C 2043/106 (2013.01); B29C 2043/562 (2013.01)
(58) Field of Classification Search
 CPC ......... B29C 43/52; B29C 43/10; B29C 43/36; B29C 43/56; B29C 2043/562; B29C 2043/106; B30B 11/001; B30B 15/34; B30B 11/002; H02K 3/44
 USPC .................................................... 425/405.2
 See application file for complete search history.

(56) References Cited

U.S. PATENT DOCUMENTS 8,647,092 B2 * 2/2014 Nakai ................... B30B 11/002
                                                    219/400
8,652,370 B2 * 2/2014 Fujikawa ................ B28B 11/24
                                                    264/85
2003/0215539 A1 * 11/2003 Manabe .................... F27D 7/06
                                                    425/405.2

(Continued)

FOREIGN PATENT DOCUMENTS

KR    10-1311563 B1    9/2013
KR    10-1708490 B1    2/2017
KR    10-2138354 B1    7/2020

OTHER PUBLICATIONS

English Translation of JP4471783 (Year: 2010).*

*Primary Examiner* — Matthew J Daniels
*Assistant Examiner* — Hana C Page
(74) *Attorney, Agent, or Firm* — Revolution IP, PLLC

(57) ABSTRACT

An isostatic press apparatus includes a pressure vessel for pressing a workpiece using the pressure of a pressurized liquid, a heat exchanger for exchanging heat with the pressurized liquid, a heating/cooling supply unit for heating or cooling a heat exchange medium that is to be supplied to the heat exchanger, a pressurized liquid circulation fan for circulating the pressurized liquid, a circulation fan motor for rotating the pressurized liquid circulation fan, a motor accommodation unit for accommodating the circulation fan motor therein, and a pressure equalization adjustment unit for increasing or decreasing the internal pressure in the motor accommodation unit to match the internal pressure in the pressure vessel.

7 Claims, 3 Drawing Sheets

(56) References Cited

U.S. PATENT DOCUMENTS

2014/0272745 A1\* 9/2014 Gardin ............... F27D 7/04
432/24

\* cited by examiner

[FIG.1]
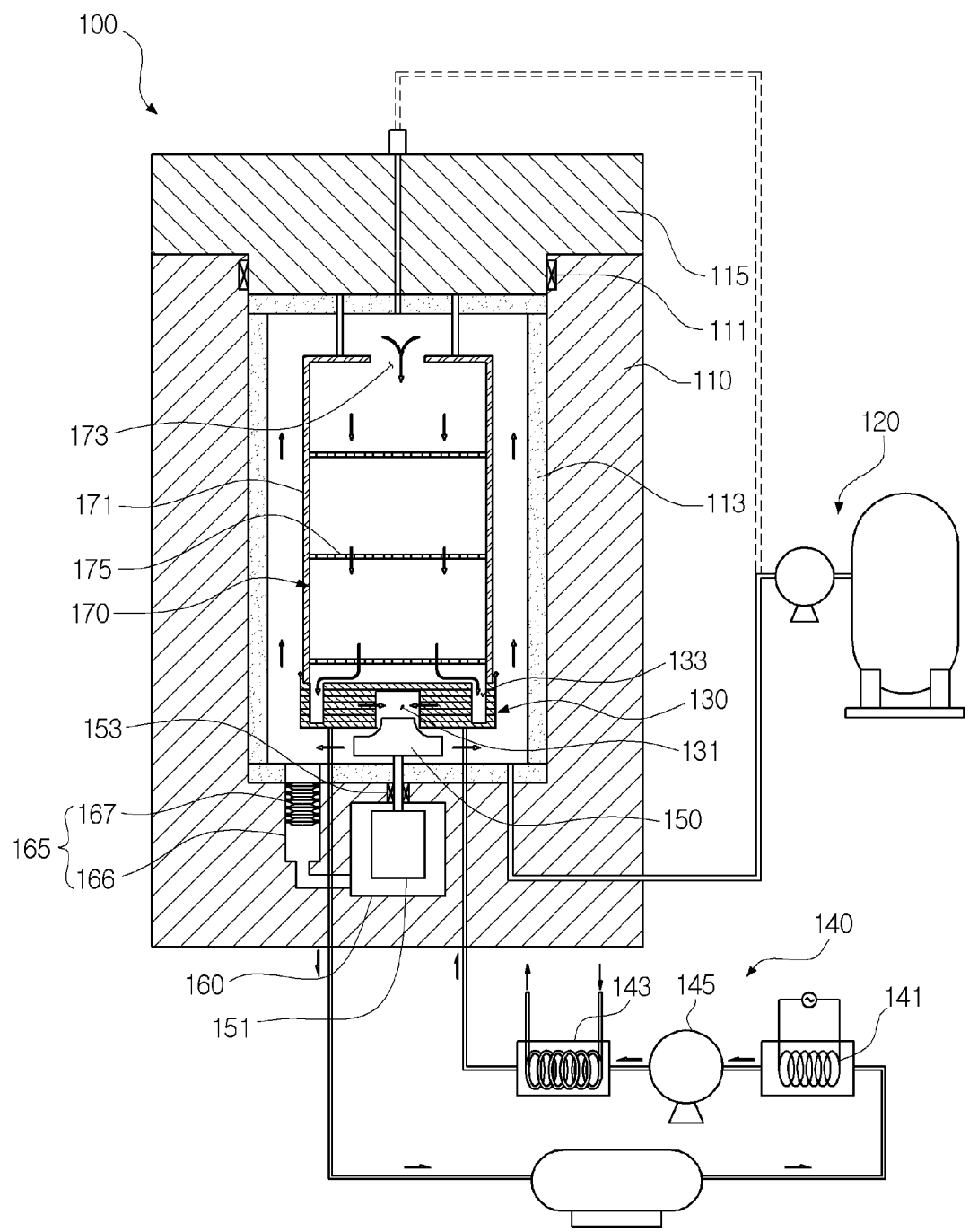

[FIG.2]
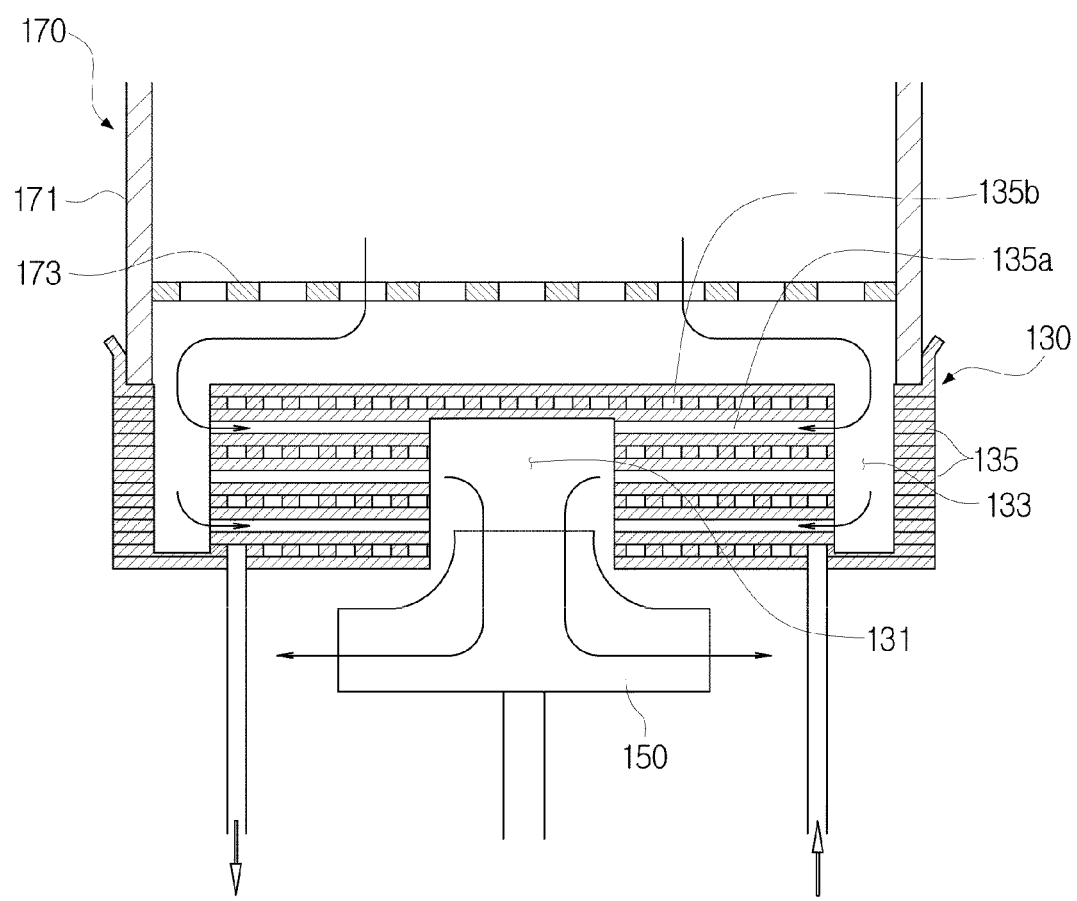

[FIG.3]
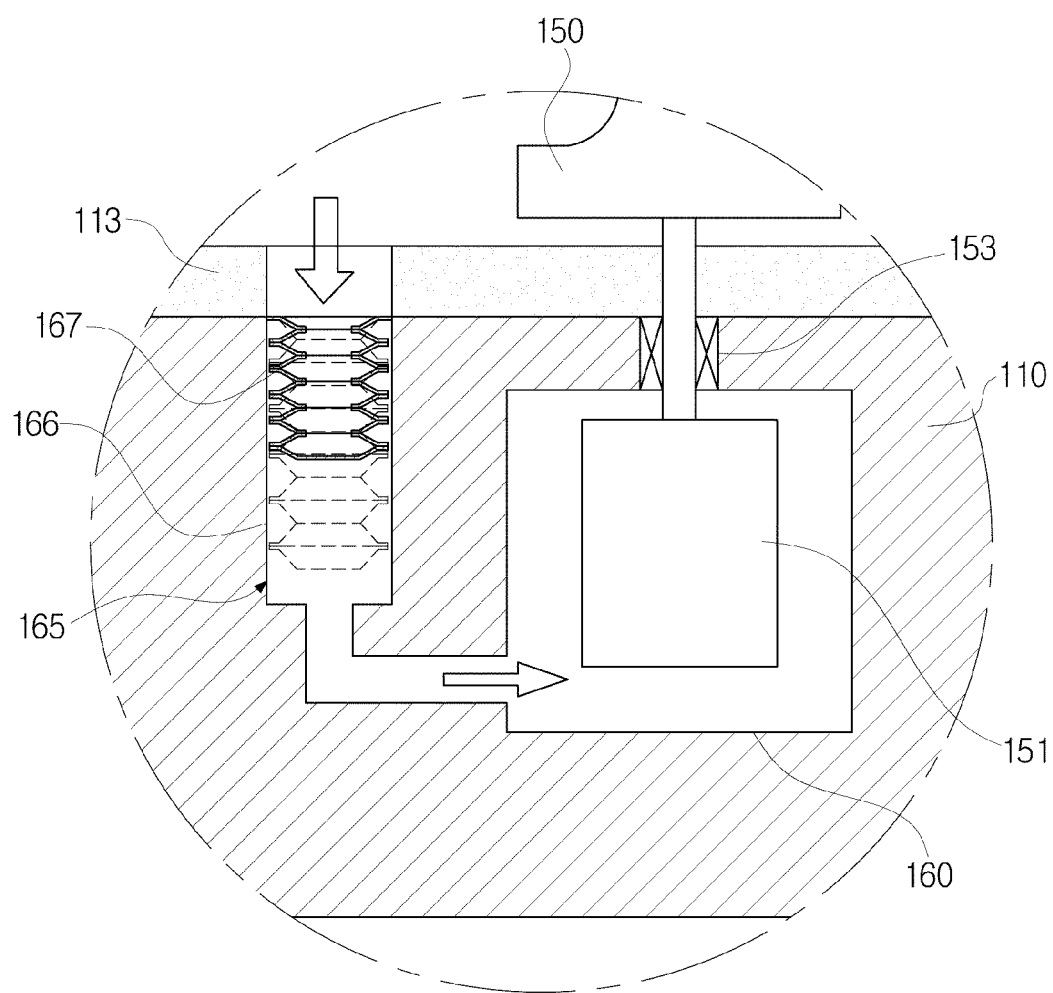

ISOSTATIC PRESS APPARATUS ENABLING RAPID HEATING AND COOLING USING PRESSURIZED LIQUID CIRCULATION FAN

BACKGROUND OF THE INVENTION

Field of the Invention

The present invention relates to an isostatic press apparatus for pressing a workpiece using a pressurized liquid, and more particularly to an isostatic press apparatus enabling rapid heating and cooling using a pressurized liquid circulation fan that is capable of performing isostatic pressing while heating or cooling a workpiece by heating or cooling a pressurized liquid.

Description of the Related Art

In general, an isostatic press apparatus presses a workpiece using the pressure of a fluid that is supplied to a pressure vessel at high pressure.

An isostatic press apparatus is classified as a warm isostatic press (WIP) apparatus or a hot isostatic press (HIP) apparatus, which performs pressing in the state of heating a workpiece, and a cold isostatic press (CIP) apparatus, which performs pressing in the state of cooling a workpiece. The HIP apparatus uses a gaseous fluid, and the WIP apparatus and the CIP apparatus use a liquid. The HIP apparatus presses a workpiece using a gaseous fluid heated to a high temperature ranging from 300° C. to 2500° C., the WIP apparatus presses a workpiece using a liquid heated to 250° C. or lower, and the CIP apparatus presses a workpiece using a liquid at room temperature. Therefore, these isostatic press apparatuses are used for different kinds of products.

In the case of the WIP apparatus, it usually takes a long time to heat or cool a workpiece, and a workpiece that has undergone compression processing is withdrawn in a high-temperature state. Therefore, in the case of a workpiece that is transformed in a high-temperature state, it is required to cool the workpiece before withdrawing the same. However, in this case, a springback phenomenon in which at least a portion of the compressed workpiece returns to the original shape thereof occurs, and thus the effect of compression processing is reduced.

The present applicant has developed technology for solving the above problem, disclosed in Korean Patent Registration No. 10-1708490 (hereinafter referred to as "Conventional Art 1") and Korean Patent Registration No. 10-2138354 (hereinafter referred to as "Conventional Art 2").

Conventional Art 1 is configured to selectively perform cold isostatic pressing and hot isostatic pressing by cooling or heating a heat exchanger using a selective supply unit. Conventional Art 2 is configured to circulate a fluid using a tray in order to quickly change the temperature of the pressurized fluid, thereby rapidly processing a workpiece with uniform quality.

In this regard, Korean Patent Registration No. 10-1311563 (hereinafter referred to as "Conventional Art 3") discloses an isostatic press apparatus in which the circulation of a pressurized medium gas is controlled by a forced circulation unit.

However, because Conventional Art 1 and Conventional Art 2 do not have a separate configuration for circulating a pressurized medium, it takes a long time to heat and cool the pressurized medium. Although Conventional Art 3 has a forced circulation unit for forcibly circulating a pressurized medium, it has a problem in which a motor for driving a fan is damaged due to the inflow of the pressurized medium into the motor and a pressure difference.

SUMMARY OF THE INVENTION

The present invention has been made to solve the above problems, and it is an object of the present invention to provide an isostatic press apparatus enabling rapid heating and cooling using a pressurized liquid circulation fan in which a heating/cooling supply unit, which includes a heater and a cooler, heats or cools a heat exchange medium that is to be supplied to a heat exchanger, and thus a pressurized liquid is rapidly heated or cooled, thereby achieving hot isostatic pressing and cold isostatic pressing and rapidly cooling a workpiece before withdrawing the same, thus preventing or minimizing a springback phenomenon or thermal deformation of the workpiece.

It is another object of the present invention to provide an isostatic press apparatus enabling rapid heating and cooling using a pressurized liquid circulation fan in which a pressure equalization adjustment unit equalizes the pressure in a motor accommodation unit, in which a circulation fan motor is accommodated, with the pressure in a pressure vessel in accordance with changes in the pressure in the pressure vessel, thereby preventing introduction of pressurized liquid into the motor accommodation unit due to a pressure difference, thus preventing damage to the circulation fan motor.

It is still another object of the present invention to provide an isostatic press apparatus enabling rapid heating and cooling using a pressurized liquid circulation fan in which the pressurized liquid circulation fan circulates a pressurized liquid and a tray forms a circulation flow of the pressurized liquid in a pressure vessel, thereby making it possible to rapidly heat or cool the pressurized liquid and to maintain the temperature of the pressurized liquid uniform for a long time, thus enabling tasks requiring rapid processing and minimizing defects in a workpiece.

In accordance with the present invention, the above and other objects can be accomplished by the provision of an isostatic press apparatus enabling rapid heating and cooling, the isostatic press apparatus including a pressure vessel configured to press a workpiece using the pressure of a pressurized liquid, a heat exchanger mounted in the pressure vessel, the heat exchanger being configured to exchange heat with the pressurized liquid in order to heat or cool the pressurized liquid, a heating/cooling supply unit configured to heat or cool a heat exchange medium that is to be supplied to the heat exchanger in order to heat or cool the heat exchanger, a pressurized liquid circulation fan disposed in the pressure vessel, the pressurized liquid circulation fan being configured to circulate the pressurized liquid in the pressure vessel, a circulation fan motor configured to rotate the pressurized liquid circulation fan, a motor accommodation unit formed so as to be isolated from the pressure vessel to accommodate the circulation fan motor therein, and a pressure equalization adjustment unit configured to increase or decrease the internal pressure in the motor accommodation unit to match the internal pressure in the pressure vessel in order to prevent the pressurized liquid from leaking to the motor accommodation unit due to a difference in pressure between the pressure vessel and the motor accommodation unit.

The pressure equalization adjustment unit may include a bellows member disposed between the pressure vessel and the motor accommodation unit. The bellows member may expand or contract in accordance with an increase or decrease in pressure in the pressure vessel in order to adjust the pressure in the motor accommodation unit.

The bellows member may be formed in a manner such that multiple ring-shaped metal plates are stacked and the inner circumferences of neighboring plates and the outer circumferences of neighboring plates are alternately bonded.

The isostatic press apparatus may further include an insulating liquid charged in the motor accommodation unit in order to facilitate a change in pressure in the motor accommodation unit in response to the operation of the pressure equalization adjustment unit.

The heat exchanger may include a plurality of thermally conductive plates stacked on one another, a medium passage formed in the plurality of thermally conductive plates to allow the heat exchange medium to pass therethrough, and a circulation passage formed in the plurality of thermally conductive plates to allow the pressurized liquid to pass therethrough. The medium passage and the circulation passage may not communicate with each other.

The heat exchanger may further include a central supply portion, formed in the center of the heat exchanger so as to communicate with one end of the circulation passage and to allow the pressurized liquid circulation fan to be disposed therein so that the pressurized liquid is supplied thereto from the circulation passage or is supplied therefrom to the circulation passage by the pressurized liquid circulation fan, and a seating supply portion, formed so as to communicate with a tray in which the workpiece is seated and the opposite end of the circulation passage so that the pressurized liquid that has passed through the circulation passage is supplied to the tray or the pressurized liquid that has passed through the tray is supplied to the circulation passage.

The isostatic press apparatus may further include a tray configured to allow the workpiece to be seated therein in order to carry the workpiece into or out of the pressure vessel. The tray may include inlet/outlet holes, formed in the upper and lower portions thereof to allow the pressurized liquid to be introduced into and discharged from the tray so that the pressurized liquid forms a circulation flow in the tray, and a tray wall, surrounding the peripheries of the inlet/outlet holes and partitioning the space in the pressure vessel into a seating space in which the workpiece is received and a space between the tray and the pressure vessel.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a side-sectional view schematically showing an isostatic press apparatus enabling rapid heating and cooling using a pressurized liquid circulation fan according to an embodiment of the present invention;

FIG. 2 is a side-sectional view schematically showing a heat exchanger of the isostatic press apparatus enabling rapid heating and cooling using a pressurized liquid circulation fan according to an embodiment of the present invention; and FIG. 3 is a side-sectional view schematically showing the operational state of a motor accommodation unit of the isostatic press apparatus enabling rapid heating and cooling using a pressurized liquid circulation fan according to an embodiment of the present invention.

DETAILED DESCRIPTION OF THE INVENTION

Hereinafter, exemplary embodiments of the present invention will be described with reference to the accompanying drawings.

As shown in FIG. 1, an isostatic press apparatus 100 enabling rapid heating and cooling using a pressurized liquid circulation fan 150 according to an embodiment of the present invention may include a pressure vessel 110.

The pressure vessel 110 may be filled with a pressurized liquid, and may perform processing on a workpiece received therein in a manner of uniformly pressing the periphery of the workpiece using the pressurized liquid.

In the embodiment, "processing" refers to all kinds of tasks for transforming a workpiece, for example, a task of pressing a workpiece to change the shape thereof, a task of compressing powder to a predetermined shape, a task of pressing a workpiece to densify the same, a task of pressing a workpiece to change the texture thereof, and a task of pressing workpieces to diffusion-bond the same.

The pressure vessel 110 may be formed in a cylindrical shape in which only one of the upper portion and the lower portion thereof is open, or both the upper portion and the lower portion thereof are open. The pressure vessel 110 may be provided with a lid 115 to open and close the open upper portion, the open lower portion, or both the open upper portion and the open lower portion.

The lid 115 may be mounted to the pressure vessel 110 so as to open and close the pressure vessel 110 by means of a lid opening/closing mechanism. The lid 115 may include an insertion portion, which is inserted into the pressure vessel 110 to seal the open portion of the pressure vessel 110. The insertion portion of the lid 115 has an outer diameter corresponding to the inner diameter of the pressure vessel 110.

A high-pressure seal 111 may be disposed between the lid and the pressure vessel 110 in order to prevent the pressurized liquid in the pressure vessel 110 from leaking to the outside. The high-pressure seal 111 may be implemented as any of various well-known types of high-pressure seals, so long as it is capable of being elastically deformed by the internal pressure of the pressure vessel 110 or deformed along an inclined surface when pressure is applied to the inclined surface, thereby ensuring improved airtightness.

The pressure vessel 110 may have a charging port and a discharging port in order to charge and discharge a pressurized liquid into and from the pressure vessel 110. The charging port and the discharging port may be formed in the lid 115. In the case in which the lid 115 is mounted to the lower portion of the pressure vessel 110 so as to open the same, no separate discharging port may be formed.

A pressurized liquid supply unit 120 may be connected to the charging port of the pressure vessel 110 so as to supply a pressurized liquid to the interior of the pressure vessel 110 at high pressure.

In this case, the pressurized liquid supply unit 120 may be implemented as a pump or a piston in order to supply the pressurized liquid at high pressure.

A metal wire may be wound around the pressure vessel 110 in order to increase the rigidity of the pressure vessel 110 so that the pressure vessel 110 withstands high pressure. The metal wire may be implemented as a piano wire.

When the pressure vessel 110 is reinforced by a metal wire, it is capable of withstanding extra-high pressure of 6000 bar or more, whereby it is possible to process a workpiece at extra-high pressure.

A thermal insulator 113 may be disposed in the pressure vessel 110 in order to prevent internal heat of the pressure vessel 110 from being dissipated to the outside or to prevent the inner temperature of the pressure vessel 110 from changing due to the exchange of heat with the outside.

The thermal insulator 113 may be disposed on the surface of the lid 115 of the pressure vessel 110 as well as in the pressure vessel 110, thereby insulating the entire inner surface of the pressure vessel 110.

The main purpose of the thermal insulator 113 is to maintain the temperature of the pressurized liquid, which is heated or cooled in the pressure vessel 110, rather than to maintain the inner temperature of the pressure vessel 110, thereby enabling efficient heating and cooling of a workpiece.

The pressurized liquid charged into the pressure vessel 110 to press the workpiece may be water or oil.

Here, if gas is used to press the workpiece, it takes a long time to press the workpiece because gas is more compressible than liquid, and it is difficult to store gas because gas occupies a greater volume than liquid. Further, in the event of leakage of gas, it is difficult to collect the leaked gas. Furthermore, it is not easy to handle gas.

In contrast, in the embodiment, a pressurized liquid is charged into the pressure vessel 110 in order to press a workpiece. Accordingly, the embodiment is advantageous from the aspects of storage, recovery in the event of leakage, and handling.

As shown in FIG. 1, the isostatic press apparatus 100 enabling rapid heating and cooling using the pressurized liquid circulation fan 150 according to the embodiment of the present invention may include a tray 170.

The tray 170 may accommodate a workpiece, and may be used to carry the workpiece into or out of the pressure vessel 110.

The tray 170 may include a plurality of shelves 175 so that each of the workpieces is seated on a respective one of the shelves 175. The workpieces may be carried into or out of the pressure vessel 110 in the state of being seated on the shelves 175.

In addition to the function of carrying the workpiece into or out of the pressure vessel 110, the tray 170 may function to form a circulation flow of the pressurized liquid in the pressure vessel 110.

The tray 170 may include a tray wall 171, which defines an inner space thereof in which the workpiece is placed. That is, the inner space of the tray 170 may be isolated from the inner space of the pressure vessel 110 by the tray wall 171. The tray wall 171 may be formed in a cylindrical shape.

A door may be mounted to the tray wall 171 in order to open and close the same so that the workpiece is put into or taken out of the tray 170.

The tray 170 may have inlet/outlet holes 173 formed in the upper and lower portions thereof to allow the pressurized liquid to be introduced into and discharged from the tray 170 so that the pressurized liquid passes through the inner space of the tray 170. The inlet/outlet holes 173 may be formed so as to penetrate the upper and lower portions of the tray 170, or may be formed in such a shape that the entire areas of the upper and lower portions of the tray 170 are open.

Each of the shelves 175 may have a plurality of shelf-holes formed therethrough to allow the pressurized liquid flowing through the inner space of the tray 170 to pass therethrough.

In the embodiment, the pressurized liquid flows into the tray 170 through the inlet/outlet hole 173 formed in the upper portion of the tray 170, and flows out of the tray 170 through the inlet/outlet hole 173 formed in the lower portion of the tray 170. The pressurized liquid that flows out of the tray 170 is moved upwards to the region above the tray 170 along the outer surface of the tray wall 171 by the pressurized liquid circulation fan 150, and flows again into the tray 170 through the inlet/outlet hole 173 formed in the upper portion of the tray 170. In this way, the pressurized liquid circulates in the tray 170.

Alternatively, the pressurized liquid may circulate in the direction opposite the direction in the embodiment described above. That is, the pressurized liquid may flow into the tray 170 through the inlet/outlet hole 173 formed in the lower portion of the tray 170, and may flow out of the tray 170 through the inlet/outlet hole 173 formed in the upper portion of the tray 170, and the pressurized liquid that flows out of the tray 170 may be moved downwards along the outer surface of the tray wall 171, and may flow again into the tray 170 through the inlet/outlet hole 173 formed in the lower portion of the tray 170.

The tray 170 may be mounted to the lid 115 for sealing the pressure vessel 110. Thus, when the lid 115 is removed from the pressure vessel 110, the tray 170 may be drawn out of the pressure vessel 110, and when the lid 115 seals the pressure vessel 110, the tray 170 may be introduced into the pressure vessel 110.

As shown in FIGS. 1 and 2, the isostatic press apparatus 100 enabling rapid heating and cooling using the pressurized liquid circulation fan 150 according to the embodiment of the present invention may include a heat exchanger 130.

The heat exchanger 130 may be disposed in the pressure vessel 110 in order to exchange heat with the pressurized liquid flowing through the pressure vessel 110, thereby heating or cooling the pressurized liquid.

The heat exchanger 130 may be configured to circulate a heat exchange medium therein so as to exchange heat with the pressurized liquid, thereby heating and cooling the pressurized liquid.

The heat exchanger 130 may have a medium passage 135b, through which the heat exchange medium passes to exchange heat with the pressurized liquid, and a circulation passage 135a, through which the pressurized liquid passes to exchange heat with the heat exchange medium.

In the heat exchanger 130, the medium passage 135b and the circulation passage 135a may be formed so as not to communicate with each other in order to prevent the heat exchange medium and the pressurized liquid from mixing with each other.

The heat exchanger 130 may be formed such that a plurality of thermally conductive plates 135 is stacked, and the plurality of thermally conductive plates 135 may be bonded to each other using a diffusion bonding method.

For example, the heat exchanger 130 may be manufactured in the manner of forming a circulation passage groove for forming the circulation passage 135a and a medium passage groove for forming the medium passage 135b in each of the thermally conductive plates 135, layering the thermally conductive plates 135, and bonding the thermally conductive plates 135 to each other.

Since the circulation passage 135a and the medium passage 135b formed in the thermally conductive plates 135 do not communicate with each other, the pressurized liquid and the heat exchange medium may move independently without mixing with each other.

The thermally conductive plates 135 may be bonded to each other using a diffusion bonding method, i.e. may be bonded to each other by being pressed by external force.

The heat exchanger 130 may include a central supply portion 131 and a seating supply portion 133.

The central supply portion 131 may be formed in the center of the heat exchanger 130, and may communicate with one end of the circulation passage 135a.

The portion of the pressurized liquid circulation fan 150 that generates suction force for suctioning the pressurized liquid may be located in the central supply portion 131, and the pressurized liquid that has been heated or cooled while passing through the circulation passage 135a may be supplied to the pressurized liquid circulation fan 150 by the suction force of the pressurized liquid circulation fan 150.

The tray 170 may be seated on the seating supply portion 133. In the state in which the tray 170 is seated on the seating supply portion 133, the seating supply portion 133 may communicate with the region close to the inner circumference of the tray wall 171 and the other end of the circulation passage 135a so that the pressurized liquid that has exchanged heat with the workpiece in the tray 170 is introduced into the heat exchanger 130.

When the tray 170 is seated on the seating supply portion 133, the circumference of the lower end of the tray 170 may be brought into close contact with the seating supply portion 133. The pressurized liquid may be moved from the other end of the circulation passage 135a to the one end of the circulation passage 135a by the suction force of the pressurized liquid circulation fan 150, and at the same time may exchange heat with the heat exchange medium. Thereafter, the pressurized liquid suctioned by the pressurized liquid circulation fan 150 may be discharged to the outside of the tray 170.

As shown in FIG. 1, the isostatic press apparatus 100 enabling rapid heating and cooling using the pressurized liquid circulation fan 150 according to the embodiment of the present invention may include a heating/cooling supply unit 140.

The heating/cooling supply unit 140 may heat or cool the heat exchange medium that is to be supplied to the heat exchanger 130 in order to heat or cool the heat exchanger 130.

The heating/cooling supply unit 140 may include a heater 141 for heating the heat exchange medium and a cooler 143 for cooling the heat exchange medium.

For example, the heater 141 may be implemented as a heating element or a thermoelectric module, which is heated by application of electricity thereto.

For example, the cooler 143 may include a thermoelectric module, and the cooled surface of the thermoelectric module may cool the heat exchange medium.

As another embodiment, the cooler 143 may include a freezing cycle, i.e. a condenser, an evaporator, a compressor, and an expander, so that a phase-change material cools the evaporator via the freezing cycle and the heat exchange medium is cooled through heat exchange with the evaporator.

The heating/cooling supply unit 140 may include a medium circulation pump 145. The heat exchange medium may be forcibly circulated through the heat exchanger 130, the heater 141, and the cooler 143 by the medium circulation pump 145 so as to be heated or cooled.

The heating/cooling supply unit 140 may selectively operate the heater 141 and the cooler 143 in order to heat or cool the pressurized liquid.

For example, when it is intended to heat the pressurized liquid, the heating/cooling supply unit 140 may stop operating the cooler 143 and may operate only the heater 141, and when it is intended to cool the pressurized liquid, the heating/cooling supply unit 140 may stop operating the heater 141 and may operate only the cooler 143.

The heater 141 and the cooler 143 may be connected in series, and the heating/cooling supply unit 140 may operate only one of the heater 141 and the cooler 143 in order to heat or cool the heat exchange medium. Alternatively, the heater 141 and the cooler 143 may be connected in parallel, and the heating/cooling supply unit 140 may perform control such that the heat exchange medium passes through only one of the heater 141 and the cooler 143 so as to be heated or cooled.

As shown in FIG. 1, the isostatic press apparatus 100 enabling rapid heating and cooling using the pressurized liquid circulation fan 150 according to the embodiment of the present invention may include a pressurized liquid circulation fan 150 and a circulation fan motor 151.

The pressurized liquid circulation fan 150 may include a plurality of vanes, which extend radially. The pressurized liquid circulation fan 150 may generate suction force and discharge force due to the centrifugal force that is generated during the rotation thereof. The pressurized liquid circulation fan 150 may be implemented as a centrifugal fan, which suctions a fluid in the axial direction thereof and discharges the fluid in the radial direction thereof.

Alternatively, the pressurized liquid circulation fan 150 may be implemented as any of various types of impellers, rather than a centrifugal fan, so long as it is capable of delivering a liquid.

The central portion of the pressurized liquid circulation fan 150, at which suction force is generated, may be located in the central supply portion 131 of the heat exchanger 130 so as to suction the pressurized liquid through the central supply portion 131. The suctioned pressurized liquid may be discharged to the outside of the heat exchanger 130 in the radial direction.

The circulation fan motor 151 may rotate the pressurized liquid circulation fan 150. The circulation fan motor 151 may be implemented as an electric motor, which is rotated by application of electricity thereto.

In the case in which the circulation fan motor 151 is located in the pressure vessel 110, the pressurized liquid, which is supplied to the pressure vessel 110, may flow into the circulation fan motor 151, leading to the occurrence of a short circuit in the circulation fan motor 151.

Therefore, the circulation fan motor 151 may be accommodated in a motor accommodation unit 160, which will be described below.

As shown in FIGS. 1 and 3, the isostatic press apparatus 100 enabling rapid heating and cooling using the pressurized liquid circulation fan 150 according to the embodiment of the present invention may include a motor accommodation unit 160 and a pressure equalization adjustment unit 165.

The motor accommodation unit 160 may have therein a space formed so as to be isolated from the space in the pressure vessel 110 into which the pressurized liquid is charged. The circulation fan motor 151 may be accommodated in the motor accommodation unit 160.

The motor shaft of the circulation fan motor 151 accommodated in the motor accommodation unit 160 may penetrate the pressure vessel 110 and may be coupled to the pressurized liquid circulation fan 150 located in the pressure vessel 110. A shaft seal 153 may be mounted in the portion of the pressure vessel 110 through which the motor shaft passes in order to prevent the pressurized liquid from being introduced into the motor accommodation unit 160.

The motor accommodation unit 160 may be filled with an insulating liquid. The insulating liquid, which is insulative, may prevent the occurrence of a short circuit in the circulation fan motor 151 due to the electricity supplied to the circulation fan motor 151.

In the state in which the motor accommodation unit 160 is filled with the insulating liquid, the circulation fan motor 151 may be placed in the motor accommodation unit 160 so as to be immersed in the insulating liquid.

The insulating liquid may be a liquid having compressibility equal to or lower than that of the pressurized liquid charged in the pressure vessel 110. For example, the insulating liquid may be a non-curable liquid.

The pressure equalization adjustment unit 165 may increase or reduce the pressure in the motor accommodation unit 160 in proportion to changes in the internal pressure of the pressure vessel 110 so that the internal pressure of the pressure vessel 110 and the internal pressure of the motor accommodation unit 160 become identical or the difference therebetween is minimized.

The pressure equalization adjustment unit 165 may be mounted in the portion through which the motor accommodation unit 160 and the pressure vessel 110 communicate with each other. Since the pressure equalization adjustment unit 165 reduces the difference in pressure between the pressure vessel 110 and the motor accommodation unit 160, damage to the shaft seal 153 due to the pressure difference may be minimized, whereby the pressurized liquid may be prevented from flowing into the motor accommodation unit 160, thus minimizing damage to the circulation fan motor 151.

The pressure equalization adjustment unit 165 may include a pressure chamber 166, which is formed in a portion of the motor accommodation unit 160 so as to communicate with the pressure vessel 110. Alternatively, the pressure chamber 166 may be formed at a position spaced apart from the motor accommodation unit 160, and may communicate with the motor accommodation unit 160 through a communication passage.

The pressure equalization adjustment unit 165 may include a bellows member 167.

The bellows member 167 may be increased or reduced in volume by the pressurized liquid that is charged into the pressure vessel 110, thereby pressurizing or depressurizing the insulating liquid in the motor accommodation unit 160. In this way, the bellows member 167 may increase or reduce the pressure in the motor accommodation unit 160.

The bellows member 167 may be mounted in the pressure chamber 166 so as to be expanded or contracted in a direction oriented toward the motor accommodation unit 160.

The bellows member 167 may have one open end and one closed end. The bellows member 167 may be mounted in the pressure chamber 166 such that the open end thereof is oriented toward the pressure vessel 110 and the closed end thereof is oriented toward the motor accommodation unit 160.

When the pressurized liquid in the pressure vessel 110 enters the bellows member 167 through the open end thereof, the bellows member 167 may expand. In the expanded state, when the pressurized liquid escapes from the bellows member 167, the bellows member 167 may contract, i.e. may be elastically restored to the original shape thereof.

The bellows member 167 may be made of metal so as to withstand the high pressure of the pressurized liquid that is charged into the pressure vessel 110.

In order to allow a fluid to enter the bellows member 167, the bellows member 167 may be formed in a manner such that multiple ring-shaped metal plates are stacked and the inner circumferences of neighboring plates and the outer circumferences of neighboring plates are alternately bonded.

For example, the bellows member 167 may be manufactured as follows: in the state in which multiple ring-shaped plates are stacked, the inner circumferences of the first and second neighboring plates are bonded to each other, the outer circumference of the third plate, which is disposed on the second plate, is bonded to the outer circumference of the second plate, and the inner circumference of the fourth plate, which is disposed on the third plate, is bonded to the inner circumference of the third plate. The embodiment is not limited to any specific number of ring-shaped metal plates.

Subsequently, a closed plate may be bonded to one of the two opposite ends of the bellows member 167, whereby one end of the bellows member 167 may be open, and the other end thereof may be closed.

When the bellows member 167 is expanded in the pressure chamber 166 by the pressure in the pressure vessel 110 and thus occupies a larger space in the pressure chamber 166, the bellows member 167 may pressurize the insulating liquid present in the pressure chamber 166, thereby increasing the pressure in the motor accommodation unit 160.

On the other hand, in the expanded state of the bellows member 167, when the pressure in the pressure vessel 110 is lowered, the pressurized liquid that has entered the bellows member 167 may be moved back to the pressure vessel 110 by the pressure in the pressure chamber 166, and accordingly, the bellows member 167 may contract.

The operation and effects of the components described above will be described below.

In the isostatic press apparatus 100 enabling rapid heating and cooling using the pressurized liquid circulation fan 150 according to the embodiment of the present invention, the heat exchanger 130 for heating or cooling the pressurized liquid and the thermal insulator 113 for maintaining the temperature of the heated or cooled pressurized liquid may be mounted in the pressure vessel 110.

The pressurized liquid may be supplied to the interior of the pressure vessel 110 at high pressure, so a workpiece received in the pressure vessel 110 may be processed by the pressure of the pressurized liquid. The pressurized liquid may be supplied to the interior of the pressure vessel 110, and may be discharged to the outside of the pressure vessel 110 through the charging port and the discharging port formed in the pressure vessel 110.

The pressurized liquid may be supplied to the interior of the pressure vessel 110 at high pressure by the pressurized liquid supply unit 120.

In the heat exchanger 130, the heat exchange medium may pass through the medium passage 135b, which does not communicate with the circulation passage 135a, and the pressurized liquid may exchange heat with the heat exchange medium so as to be heated or cooled while passing through the circulation passage 135a.

In the heat exchanger 130, the pressurized liquid that has been heated or cooled in the circulation passage 135a may flow into the central supply portion 131, which communicates with one end of the circulation passage 135a.

The tray 170 may be seated on the seating supply portion 133 of the heat exchanger 130. The seating supply portion 133 may communicate with the region close to the inner circumference of the tray 170 and the other end of the circulation passage 135a so that the pressurized liquid in the tray 170 is introduced into the circulation passage 135a of the heat exchanger 130.

The thermally conductive plates 135, which constitute the heat exchanger 130, may be stacked and diffusion bonded to each other in order to withstand high pressure.

In the state in which the tray 170 is seated on the seating supply portion 133, a workpiece may be placed on each of the shelves 175 of the tray 170, which are arranged in a multi-stage structure. The pressurized liquid introduced into the tray 170 may pass through the plurality of shelf-holes formed through the shelves 175.

The pressurized liquid may pass through the tray 170 from the top to the bottom through the inlet/outlet holes 173 formed in the upper and lower portions of the tray 170. While passing through the tray 170, the pressurized liquid may press the workpiece, and may exchange heat with the workpiece so as to heat or cool the same. The tray wall 171 of the tray 170 may partition the space in the pressure vessel 110 into space in which the workpiece is placed and a passage through which the pressurized liquid flows.

Since the tray 170 is coupled to the lid 115, when the lid 115 is removed from the pressure vessel 110, the tray 170 may be drawn out of the pressure vessel 110, and when the lid 115 covers the pressure vessel 110, the tray 170 may be introduced into the pressure vessel 110.

The heating/cooling supply unit 140 may be connected to the heat exchanger 130 in order to supply a heat exchange medium to the heat exchanger 130. The heating/cooling supply unit 140 may heat the heat exchange medium using the heater 141, or may cool the heat exchange medium using the cooler 143, and may supply the heated or cooled heat exchange medium to the heat exchanger 130.

The pressurized liquid circulation fan 150 for circulating the pressurized liquid may be disposed in the central supply portion 131 of the heat exchanger 130. The pressurized liquid circulation fan 150 may be rotated by the circulation fan motor 151, thereby suctioning the pressurized liquid from the central supply portion 131 and discharging the pressurized liquid to the outside in the radial direction.

The circulation fan motor 151 may be disposed in the motor accommodation unit 160, which is isolated from the pressure vessel 110. An insulating liquid may be charged into the motor accommodation unit 160 so that the circulation fan motor 151 is immersed in the insulating liquid.

The pressure equalization adjustment unit 165 may be mounted in the motor accommodation unit 160 in order to prevent damage to the shaft seal 153, which seals the circulation fan motor 151, due to the difference in the pressure between the pressure vessel 110 and the motor accommodation unit 160.

The pressure chamber 166 of the pressure equalization adjustment unit 165 may allow the motor accommodation unit 160 and the internal space in the pressure vessel 110 to communicate with each other, and the bellows member 167 may be mounted in the pressure chamber 166 so as to be expanded or contracted by the pressure in the pressure vessel 110.

As the bellows member 167 mounted in the pressure chamber 166 is expanded or contracted in a direction oriented toward the motor accommodation unit 160, the bellows member 167 may pressurize or depressurize the insulating liquid in the motor accommodation unit 160. In this way, the bellows member 167 may increase or reduce the internal pressure in the motor accommodation unit 160 so as to match the internal pressure in the pressure vessel 110.

The bellows member 167 may be made of metal so as to minimize corrosion and withstand high pressure. The bellows member 167 may be formed in a manner such that multiple ring-shaped metal plates are stacked and the outer circumferences of neighboring plates and the inner circumferences of neighboring plates are alternately bonded.

In the isostatic press apparatus 100 enabling rapid heating and cooling using the pressurized liquid circulation fan 150 according to the embodiment of the present invention described above, the lid 115 of the pressure vessel 110 is opened, and a workpiece is placed on the shelf 175 of the tray 170.

Subsequently, the lid 115 is put on the pressure vessel 110 in order to seal the pressure vessel 110 and to put the tray 170 into the pressure vessel 110. In the state in which the pressure vessel 110 is sealed by the lid 115, a pressurized liquid is injected into the pressure vessel 110 by the pressurized liquid supply unit 120.

The pressurized liquid is injected into the pressure vessel 110 in order to maintain a predetermined pressure at which to press the workpiece. The workpiece is processed by the pressure applied thereto by the pressurized liquid at a predetermined pressure for a predetermined time period.

In order to heat or cool the workpiece when processing the same, the heating/cooling supply unit 140 selectively operates the heater 141 or the cooler 143.

When the heater 141 is operated, the heat exchange medium is heated by the heater 141, and the heated heat exchange medium is supplied to the heat exchanger 130. When the cooler 143 is operated, the heat exchange medium is cooled by the cooler 143, and the cooled heat exchange medium is supplied to the heat exchanger 130.

The heated or cooled heat exchange medium supplied to the heat exchanger 130 passes through the medium passage 135b, and the pressurized liquid passes through the circulation passage 135a of the heat exchanger 130, and at the same time exchanges heat with the heated or cooled heat exchange medium so as to be heated or cooled. The heated or cooled pressurized liquid heats or cools the workpiece to be processed.

The pressurized liquid, heated or cooled by the heat exchanger 130, is circulated in the pressure vessel 110 by the pressurized liquid circulation fan 150, thereby rapidly changing the temperature in the pressure vessel 110 and uniformly maintaining the new temperature.

When the pressurized liquid circulation fan 150 rotates, suction force is generated in the central supply portion 131 of the heat exchanger 130. Thereby, the pressurized liquid is suctioned into the other end of the circulation passage 135a of the heat exchanger 130 via the seating supply portion 133 of the heat exchanger 130, and is heated or cooled through heat exchange with the heat exchange medium in the heat exchanger 130. The heated or cooled pressurized liquid is supplied to the central supply unit 131, which communicates with the one end of the circulation passage 135a.

As the pressurized liquid is suctioned into the seating supply portion 133, which communicates with the other end of the circulation passage 135a, the pressurized liquid is introduced into the tray 170 through the inlet/outlet hole 173 formed in the upper portion of the tray wall 171. The pressurized liquid introduced into the tray 170 comes into contact with the workpiece, thereby pressing the workpiece while heating or cooling the same.

The pressurized liquid that has heated or cooled the workpiece is discharged through the inlet/outlet hole 173 formed in the lower portion of the tray 170, and is introduced into the other end of the circulation passage 135a via the seating supply portion 133. The pressurized liquid discharged from the pressurized liquid circulation fan 150 is moved upwards along the outer surface of the tray wall 171, and is introduced into the tray 170 through the inlet/outlet hole 173 formed in the upper portion of the tray 170.

That is, the pressurized liquid heated or cooled by the heat exchanger 130 is discharged to the space between the tray wall 171 and the pressure vessel 110 by the pressurized liquid circulation fan 150, and is moved to the top of the pressure vessel 110. Subsequently, the pressured liquid is introduced into the tray 170 through the inlet/outlet hole 173 formed in the upper portion of the tray 170, and presses and heats or cools the workpiece while passing through the interior of the tray 170.

The pressurized liquid that has heated or cooled the workpiece is supplied to the central supply portion 131 via the seating supply portion 133 of the heat exchanger 130, and is suctioned into the pressurized liquid circulation fan 150. Subsequently, the pressurized liquid is discharged from the pressurized liquid circulation fan 150 in the radial direction, and is moved to the space between the tray wall 171 and the pressure vessel 110.

The embodiment has been described as being configured such that the pressurized liquid that has passed through the heat exchanger 130 is moved upwards through the space between the tray wall 171 and the pressure vessel 110 and returns back to the heat exchanger 130 via the interior of the tray 170.

Alternatively, another embodiment may be configured such that the pressurized liquid discharged from the pressurized liquid circulation fan 150 is introduced into the tray 170 via the heat exchanger 130, exchanges heat with the workpiece, is discharged through the inlet/outlet hole 173 formed in the upper portion of the tray 170, is moved downwards through the space between the pressure vessel 110 and the tray wall 171, and is introduced again into the tray 170 via the heat exchanger 130 by the pressurized liquid circulation fan 150.

In this way, since the pressurized liquid is circulated by the pressurized liquid circulation fan 150, the pressurized liquid is capable of being rapidly heated or cooled by the heat exchanger 130. According, it is possible to rapidly heat or cool the workpiece, thereby rapidly processing the workpiece.

For example, when withdrawing the heated workpiece, it is required to cool the workpiece before withdrawing the same in order to prevent burning and to minimize deformation of the workpiece. According to the embodiment, the cooler 143 is operated in order to cool the heat exchanger 130, thereby shortening the time taken to cool the pressurized liquid, thus enabling rapid withdrawal of the workpiece.

Further, since the heat exchanger 130 is heated or cooled by the heating/cooling supply unit 140, it is possible to rapidly cool a workpiece that has been heated to a high temperature so as to realize, for example, quenching or to rapidly heat a workpiece that has been cooled to a low temperature.

Furthermore, since a workpiece heated to a high temperature is capable of being rapidly cooled, it is possible to prevent a springback phenomenon, which frequently occurs in a workpiece heated to a high temperature.

Meanwhile, when the pressure in the pressure vessel 110 is increased by the pressurized liquid, the bellows member 167 of the pressure equalization adjustment unit 165 expands and pressurizes the insulating liquid in the pressure chamber 166. As a result, the pressure in the motor accommodation unit 160 is also increased.

On the other hand, when the pressure in the pressure vessel 110 is lowered, the bellows member 167, which is in an expanded state, contracts and depressurizes the insulating liquid in the pressure chamber 166. As a result, the pressure in the motor accommodation unit 160 is also lowered.

In this way, since the pressure equalization adjustment unit 165 equalizes the pressure in the motor accommodation unit 160 with the pressure in the pressure vessel 110, it is possible to prevent damage to the shaft seal 153, which seals the motor shaft, due to the pressure difference, thus preventing the occurrence of a short circuit in the circulation fan motor 151 due to the introduction of the pressurized liquid into the motor accommodation unit 160.

As described above, since the isostatic press apparatus 100 enabling rapid heating and cooling using the pressurized liquid circulation fan 150 according to the embodiment of the present invention is capable of rapidly heating or cooling the pressurized liquid by circulating the pressurized liquid using the pressurized liquid circulation fan 150, it is possible to rapidly achieve a processing task, to minimize the occurrence of processing defects in the workpiece by maintaining the temperature of the workpiece uniform for a long time, and to prevent the occurrence of a springback phenomenon, in which at least a portion of the workpiece returns to the original shape thereof.

In addition, since the pressure equalization adjustment unit 165 increases or decreases the pressure in the motor accommodation unit 160 so as to match the pressure in the pressure vessel 110, it is possible to prevent damage to the shaft seal 153 due to a pressure difference, thus preventing damage to the circulation fan motor 151 due to the introduction of the pressurized liquid into the motor accommodation unit 160.

In addition, since the bellows member 167 for adjusting the pressure of the pressure equalization adjustment unit 165 is made of metal, it is possible to minimize damage thereto when the pressure greatly changes. In addition, since the heat exchanger 130 is manufactured in a manner of stacking multiple thermally conductive plates 135, it is possible to prevent the heat exchanger 130 from being damaged by the pressure in the pressure vessel 110.

In addition, since the pressurized liquid that has passed through the tray 170 is introduced into the circulation passage 135*a*, it is possible to minimize the occurrence of turbulence during circulation of the pressurized liquid, thereby rapidly heating or cooling the pressurized liquid and maintaining a uniform temperature throughout the entire internal space of the pressure vessel 110.

As is apparent from the above description, according to the present invention, since a heat exchanger is heated or cooled by a heating/cooling supply unit, it is possible to provide a warm isostatic press (WIP) apparatus enabling a rapid change in temperature and to rapidly cool a high-temperature liquid pressurized to a high pressure, thereby shortening the processing time and enabling manufacture of a high-quality product, which has no pores and is less likely to spring back.

In addition, since a pressurized liquid circulation fan circulates the pressurized liquid and a tray forms a circulation flow of the pressurized liquid in a pressure vessel, it is possible to maintain the temperature of the pressurized liquid uniform for a long time and to rapidly change the temperature of the pressurized liquid, thereby enabling tasks requiring rapid processing and minimizing defects in a workpiece.

In addition, because a circulation fan motor is mounted in a motor accommodation unit that is isolated from a pressure vessel and a pressure equalization adjustment unit is mounted in the motor accommodation unit in order to adjust the pressure in the motor accommodation unit to match the pressure in the pressure vessel, it is possible to prevent damage to a shaft seal, thus preventing damage to the circulation fan motor due to the introduction of pressurized liquid into the motor accommodation unit.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

DESCRIPTION OF REFERENCE NUMERALS

100: isostatic press apparatus enabling rapid heating and cooling using pressurized liquid circulation fan
110: pressure vessel
111: high-pressure seal
113: thermal insulator
115: lid
120: pressurized liquid supply unit
130: heat exchanger
131: central supply portion
133: seating supply portion
135: thermally conductive plate
135a: circulation passage
135b: medium passage
140: heating/cooling supply unit
141: heater
143: cooler
145: medium circulation pump
150: pressurized liquid circulation fan
151: circulation fan motor
153: shaft seal
160: motor accommodation unit
165: pressure equalization adjustment unit
166: pressure chamber
167: bellows member
170: tray
171: tray wall
173: inlet/outlet hole
175: shelf

What is claimed is:

1. An isostatic press apparatus enabling rapid heating and cooling, the isostatic press apparatus comprising:
a pressure vessel configured to press a workpiece using a pressure of a pressurized liquid;
a heat exchanger mounted in the pressure vessel, the heat exchanger being configured to exchange heat with the pressurized liquid in order to heat or cool the pressurized liquid;
a heating/cooling supply unit configured to heat or cool a heat exchange medium that is to be supplied to the heat exchanger in order to heat or cool the heat exchanger;
a pressurized liquid circulation fan disposed in the pressure vessel, the pressurized liquid circulation fan being configured to circulate the pressurized liquid in the pressure vessel;
a circulation fan motor configured to rotate the pressurized liquid circulation fan;
a motor accommodation unit disposed in the pressure vessel to accommodate the circulation fan motor therein; and
a pressure equalization adjustment unit configured to increase or decrease an internal pressure in the motor accommodation unit to match an internal pressure in the pressure vessel in order to prevent the pressurized liquid from leaking to the motor accommodation unit due to a difference in pressure between the pressure vessel and the motor accommodation unit.

2. The isostatic press apparatus of claim 1, wherein the pressure equalization adjustment unit comprises a bellows member disposed between the pressure vessel and the motor accommodation unit, and
wherein the bellows member expands or contracts in accordance with an increase or decrease in pressure in the pressure vessel in order to adjust a pressure in the motor accommodation unit.

3. The isostatic press apparatus of claim 2, wherein the bellows member is formed in a manner such that multiple ring-shaped metal plates are stacked and inner circumferences of neighboring plates and outer circumferences of neighboring plates are alternately bonded.

4. The isostatic press apparatus of claim 1, further comprising:
an insulating liquid charged in the motor accommodation unit in order to facilitate a change in pressure in the motor accommodation unit in response to operation of the pressure equalization adjustment unit.

5. The isostatic press apparatus of claim 1, wherein the heat exchanger comprises:
a plurality of thermally conductive plates stacked on one another;
a medium passage formed in the plurality of thermally conductive plates to allow the heat exchange medium to pass therethrough; and
a circulation passage formed in the plurality of thermally conductive plates to allow the pressurized liquid to pass therethrough, and
wherein the medium passage and the circulation passage do not communicate with each other.

6. The isostatic press apparatus of claim 5, wherein the heat exchanger comprises:
a central supply portion formed in a center of the heat exchanger so as to communicate with one end of the circulation passage and to allow the pressurized liquid circulation fan to be disposed therein so that the pressurized liquid is supplied thereto from the circulation passage or is supplied therefrom to the circulation passage by the pressurized liquid circulation fan; and
a seating supply portion formed so as to communicate with a tray in which the workpiece is seated and an opposite end of the circulation passage so that the pressurized liquid that has passed through the circulation passage is supplied to the tray or the pressurized liquid that has passed through the tray is supplied to the circulation passage.

7. The isostatic press apparatus of claim 1, further comprising:
a tray configured to allow the workpiece to be seated therein in order to carry the workpiece into or out of the pressure vessel,
wherein the tray comprises:
inlet/outlet holes formed in upper and lower portions thereof to allow the pressurized liquid to be introduced into and discharged from the tray so that the pressurized liquid forms a circulation flow in the tray; and
a tray wall surrounding peripheries of the inlet/outlet holes and partitioning a space in the pressure vessel into a seating space in which the workpiece is received and a space between the tray and the pressure vessel.

* * * * *